June 5, 1956  L. SAIVES  2,749,422
METHOD OF ASSEMBLING SHEET METAL ELEMENTS BY WELDING
Filed July 17, 1953  2 Sheets-Sheet 2
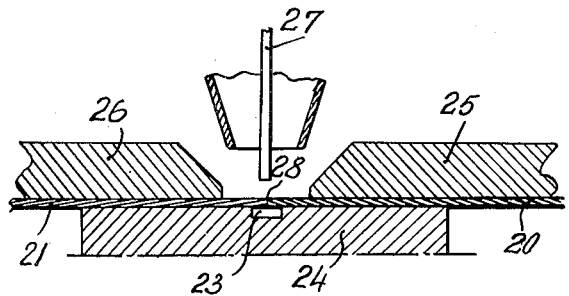
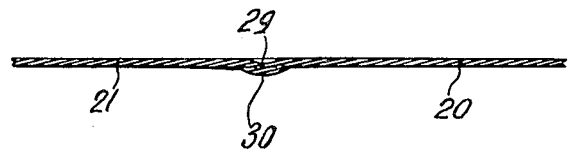
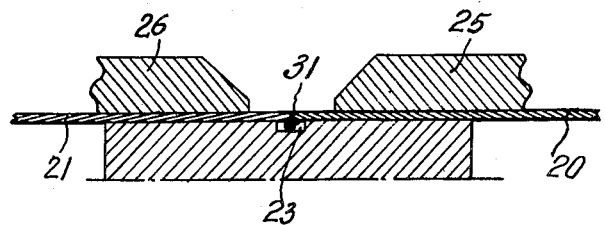
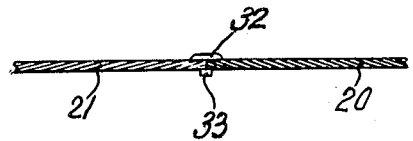

United States Patent Office 2,749,422
Patented June 5, 1956

---

2,749,422

METHOD OF ASSEMBLING SHEET METAL ELEMENTS BY WELDING

Leon Saives, Billancourt, France, assignor to Regie Nationale des Usines Renault, Billancourt, France Application July 17, 1953, Serial No. 368,754

Claims priority, application France July 31, 1952

4 Claims. (Cl. 219—10)

This invention relates to methods of welding metal in sheet form and more particularly to the known methods of assembling sheet metal parts by spot welding or seam welding such as electric arc welding, resistance welding (Thomson process) or flash welding procedures wherein at least two sheet metal parts are welded to form a lap or butt joint.

This invention is applicable more particularly to relatively thin sheet metal pressings for example of the kind generally used in automobile construction, and it provides a novel method of assembling two or more sheet metal elements by combining the butt and lap joint welding techniques in such a manner that these elements are assembled through a single operation.

Thus, the invention brings a novel solution to the problem of assembling thin or relatively thin sheet metal elements for example in the automotive industries or naval constructions.

This method is also applicable to the butt welding of two sheet metal elements with the addition of a third connecting element, the dimensional importance of which is reduced however to a minimum.

This method—based on the capillarity properties of the molten metal—is advantageous in that it minimizes the preparation of joints before assembling, avoids the inconveniences resulting from metal collapse both initially and when finishing the fillet, eliminates the formation of hollows at the upper portion of the joint, so that the resulting joint is free from the defects which result generally from these hollows and are detrimental to the appearance and mechanical strength of the weld. With the process of this invention, it is also possible to obtain a weld having a greater strength than welds obtained through the conventional welding techniques utilizing argon gas shielding.

The attached drawings forming part of this specification illustrate diagrammatically by way of example a few forms of embodiment of the invention. In the drawings:

Figures 7 and 8 are sectional views showing the conventional method of butt-welding sheet metal parts and the result thereof, respectively;

Figures 9 and 10 are sectional views showing, on the one hand, the manner in which the method of the invention can be carried out in the case of butt-welding sheet metal parts, and, on the other hand, these parts after the welding operation.

All these figures are sections taken at right angles to the line of welding or to the parts in their preassembled or assembled condition, with welding clamps (Figs. 7 and 9) and welding electrodes (Fig. 7).

Figure 1:
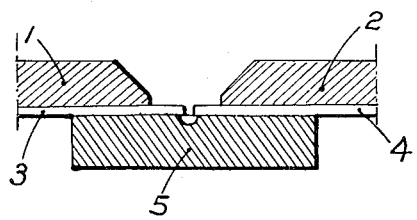
Figure 1 shows by way of comparison and in cross-sectional view the butt welding of two sheet metal parts according to the conventional method.

In Fig. 1, the conventional butt welding of sheet metal parts or pressings requires a gage consisting for example of clamps 1, 2, 5 or the like, for the twofold purpose of maintaining a suitable gap between the edges of the parts 3 and 4 to be assembled, which are clamped by the pressure exerted between parts 1 and 5, on the one hand, and parts 2 and 5, on the other hand, and of dissipating the heat developed by the welding operation.

The clamps 1, 2, 5 thus act as coolers.

Figure 2:
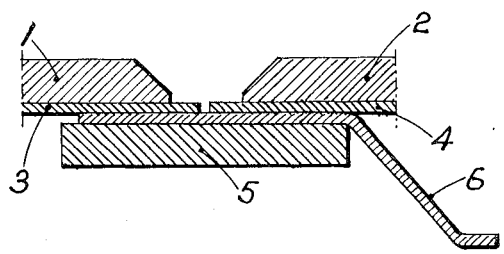
Figure 2 is a cross-sectional view showing the application of the method of this invention to the assembling of three plan sheet metal parts.

Fig. 2 illustrates the welding procedure of this invention when three sheet pieces are to be assembled.

The clamps 1, 2, 5 hold the three pieces in their adequate positions during the operation, to prevent any warping thereof.

The sheet metal elements are designated by the reference numerals 3, 4, 6; the first two 3, 4 are held in view of their butt welding and the other piece 6 laps the joint from beneath and is welded to both pieces 3, 4 through their lap welding fillet.

The welding parameters are so adjusted that the current and the speed of work enable the complete welding of sheet 6 to both sheets 3 and 4 to be effected in a single welding operation.

This welding operation is remarkably successful if carried out in an atmosphere of argon gas and gives welded surfaces so clean and smooth that only a slight grinding operation is required for finishing it to the best appearance requirements.

Figure 3:
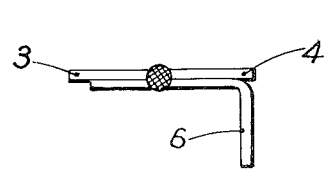
Figure 3 illustrates the assembling of two plan sheet metal parts and an L-shaped sheet metal part according to the method of the invention.
Figure 4:
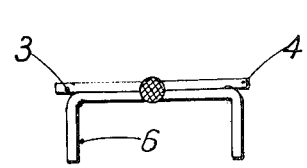
Figure 4 shows the welding of two plan sheet metal parts with a U-shaped part.

Figures 3 and 4 show two other cases of welding operations carried out in accordance with the teachings of this invention.

In Fig. 3, the sheet metal elements 3, 4 are welded to each other and also to an L-shaped sheet metal pressing 6.

In Fig. 4, the plan sheet pieces 3, 4 are welded to another, U-shaped sheet piece 6, such as for example the longitudinal members of an automobile body or the stiffening elements of any composite sheet metal structure.

Figure 5:
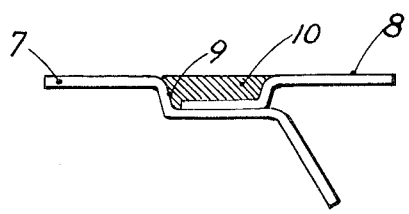
Figure 5 shows by way of comparison the conventional method of assembling two short-sectioned sheet metal pressings.
Figure 6:
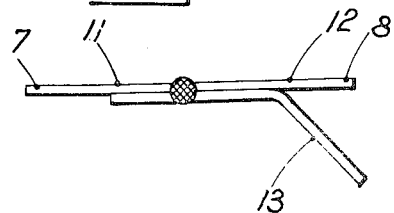
Figure 6 illustrates the manner in which the procedure of Fig. 5 can be replaced by using the method of the invention and three sheet metal parts instead of two.

Figs. 5 and 6 illustrate also by contrast the advantage resulting from the application of the method of this invention to the assembling of parts having a curvilinear shape requiring a perfect appearance without any trace of lap joint or seam or fillet or plate edges.

Fig. 5 shows that in the former technique the parts 7, 8 had to be lap welded beforehand by providing simultaneously a groove 9 in which a filler of fusible metal 10 had to be cast and subsequently levelled flush with the plate outer surfaces to dissimulate the edges thereof.

As shown in Fig. 6, this costly and complicated method is advantageously superseded by the method of the invention wherein three sheet metal parts 11, 12, 13 are used instead of two, parts 11 and 12 being butt welded and simultaneously lapped by the third part 13.

Moreover, by operating in an argon atmosphere the fillet obtained is such that little or no grinding is required for finishing the work and produces a nearly perfect surface and weld. The economy in weld metal, man-power and time is complemented by the possibility of replacing the sheet metal elements 7, 8 of Fig. 5 by three sheet metal elements 11, 12, 13 of which the first and third ones (11, 13) replace the single piece 7 of the conventional procedure thus permitting the use of hitherto waste sheets or of smaller and therefore cheaper sheet elements, as will readily occur to anybody conversant with the art.

Referring now to Figs. 7 and 8, in which Fig. 7 illustrates the parts to be assembled during the application of the conventional method and Fig. 8 the same parts after the welding operation, it will be seen that the sheet pieces 20 and 21 to be assembled by welding are so disposed between a base plate 24 and two clamping members 25, 26 that the joint 28 registers with a groove 23 formed in the base plate 24.

This joint 28 is positioned exactly in the path of, and beneath the welding electrode 27.

After assembling these sheet metal parts 20, 21 by welding, the upper face of the resulting assembly shows a hollow or channel 29 and the lower face shows a bulged fillet 30, so that when this bulged excess metal is removed by grinding the welded area has a thinner section than the other parts of the sheet metal assembly. Moreover, this method requires that the joint edges be accurately prepared. Finally, experience teaches that it is difficult to strike the welding arc so that as a rule the metal is more or less burned at either end.

The improvement brought by this invention consists in positioning between the sheet pieces 20 and 21, and into the groove 23, a wire 31 of a metal of a composition adapted to coalesce with the material of the parts to be welded, the diameter of this wire being adequately selected to conform with the thickness of the sheet metal parts and also with the desired thickness of the fillet 32 (shown in cross-section in Fig. 10).

As clearly shown in Fig. 9, the auxiliary wire 31 is laid into the groove so as to more or less contact the parts to be assembled; the groove depth may exceed slightly the wire diameter, as it is not compulsory for the wire to adhere throughout to the groove bottom.

With the parts disposed in the manner described hereabove and shown in the drawings (Figs. 9 and 10), the welding procedure is as follows:

As the welding arc is struck, it causes the metal of the sheet parts 20, 21 and of the auxiliary or welding wire 31 to melt; the sheet parts are held against motion by the clamping members 24, 25, 26, while ensuring an almost perfect seal beneath the melting area.

Under these conditions, the gases trapped inside the groove 23 exert a certain pressure whereby the molten metal is forced upwards and merges more easily with the edges of the sheet metal parts 20, 21. Moreover, this forced flow reduces the lower fillet 33 to a minimum and causes any excess metal to emerge at 32 so as to give an appreciable over-thickness particularly to the upper face of the joint. In no instances a hollow comparable with that currently observed in welds made according to the conventional procedure was observed with this novel method.

The chief advantage of this original welding procedure lies in the formation of a weld fillet or seam 32 which can subsequently be removed without any fear of reducing the thickness of the assembly, and on the other hand the presence of excess metal beneath the joint proves that it is possible to dispense with a very accurate preparation of the edges as it is no more necessary to have sheet members joining perfectly, so that some clearance in the initial joint is admissible in carrying out the novel method of this invention.

Finally, the arc-striking and the finishing operations are obviously facilitated and metal "collapses" are no more likely to occur at the beginning and at the end of the weld seam.

I claim:

1. A method of butt welding two sheet metal parts, which comprises providing a heat-conductive support having a shallow channel therein, placing a wire of fusible metal in said channel, positioning said sheet metal parts on said support with the edges of said sheet metal parts overlying said wire, clamping said sheet metal parts between said support and two heat-conductive clamp members which overlie said parts and said support, said clamping effecting a substantially gas-tight seal between said sheet metal parts and said support, and applying welding heat to said edges to fuse said edges together, to fuse said wire and to heat gas trapped in said channel, the resulting gas pressure in said channel combined with capillarity action forcing molten metal of said wire into the joint between said edges, whereby said wire is united with said edges to form a bead extending along the weld line.

2. A method of butt welding two sheet metal parts, which comprises providing a heat-conductive support having a shallow channel therein, placing a wire of fusible metal in said channel, said channel having a depth approximately equal to the cross section of said wire and a greater width so that there is gas space in said channel, positioning said sheet metal parts on said support with the edges of said parts substantially abutting one another and overlying said wire and channel, clamping said sheet metal parts between said support and two spaced heat-conductive clamp members which engage said parts close to said edges and overlie said support, said clamping effecting a substantially gas-tight seal between said sheet metal parts and said support and applying an inert gas-shielded welding arc to said edges to weld said edges together, to fuse said wire and to heat gas trapped in said channel, the resulting gas pressure in said channel combined with capillarity action forcing molten metal of said wire between said edges to produce a bead along the weld line on both surfaces of said sheet metal parts.

3. A method of butt welding two sheet metal parts which comprises providing a heat-conductive support having a shallow channel therein, placing a wire of fusible metal in said channel positioning said sheet metal parts on said support with the edges of said sheet metal parts overlying said wire, clamping said sheet metal parts between said support and two heat-conductive clamp members which overlie said parts and said support, and applying welding heat to said edges to fuse said edges together and to fuse said wire whereby by the capillarity action of the molten metal said wire is united with said edges to form a head extending along the weld line.

4. A method of butt welding two sheet metal parts, which comprises providing a heat-conductive support having a shallow channel therein, placing a wire of fusible metal in said channel, said channel having a depth approximately equal to the cross section of said wire and a slightly greater width, positioning said sheet metal parts on said support with the edges of said parts substantially abutting one another and overlying said wire and channel, said wire being much greater in width than any spacing resulting upon said abutting, clamping said sheet metal parts between said support and two spaced heat-conductive clamp members which engage said parts close to said edges and overlie said support, and applying an inert gas-shielded welding arc to said edges to weld said edges together, to fuse said wire whereby by the capillarity action of the molten metal said wire is united with said edges to produce a head along the weld line on the surfaces overlying said wire of both said sheet metal parts.

References Cited in the file of this patent
UNITED STATES PATENTS

| | | |
|---|---|---|
| 1,485,459 | Gruenfeldt | Mar. 4, 1924 |
| 1,962,352 | Kane | June 12, 1934 |
| 2,145,009 | Kier | Jan. 24, 1939 |
| 2,280,150 | Hasse | Apr. 21, 1942 |
| 2,365,696 | Grubb | Dec. 26, 1944 |
| 2,496,188 | Wiese | Jan. 31, 1950 |